United States Patent [19]

Iwasaki et al.

[11] 4,413,843

[45] Nov. 8, 1983

[54] MICROCAPSULES, METHOD FOR THEIR PRODUCTION AND PRESSURE SENSITIVE COPYING SHEET

[75] Inventors: Hiroshi Iwasaki, Kawanishi; Shinsuke Irii, Nishinomiya, both of Japan

[73] Assignee: Kanzaki Paper Manufacturing Co., Ltd., Tokyo, Japan

[21] Appl. No.: 107,066

[22] Filed: Dec. 26, 1979

[30] Foreign Application Priority Data

Dec. 29, 1978 [JP] Japan ............................ 53-165311

[51] Int. Cl.³ ............... B01J 13/02; B32B 27/42; B41L 1/36
[52] U.S. Cl. ................... 282/27.5; 71/64.11; 252/522 A; 264/4.7; 426/89; 426/650; 424/32; 427/213.34; 428/402.21; 428/402.24
[58] Field of Search ............ 252/316; 428/307, 320.6, 428/402.21; 264/4.7; 282/27.5

[56] References Cited

U.S. PATENT DOCUMENTS

| | | | |
|---|---|---|---|
| 4,001,140 | 1/1977 | Foris et al. | 252/316 |
| 4,087,376 | 5/1978 | Foris et al. | 252/316 |
| 4,100,103 | 7/1978 | Foris et al. | 252/316 |
| 4,219,604 | 8/1980 | Kakima et al. | 252/316 X |

*Primary Examiner*—Richard D. Lovering
*Attorney, Agent, or Firm*—Morgan, Finnegan, Pine, Foley & Lee

[57] ABSTRACT

The method of making microcapsules comprises performing polycondensation of an aminoaldehyde resin prepolymer in an aqueous dispersion including particles of hydrophobic core material in the presence of anion-modified polyvinyl alcohol to form aminoaldehyde resin microcapsules walls around said particles of hydrophobic core material.

8 Claims, No Drawings

MICROCAPSULES, METHOD FOR THEIR PRODUCTION AND PRESSURE SENSITIVE COPYING SHEET

BACKGROUND OF THE INVENTION

This invention relates to a method of making microcapsules containing hydrophobic capsule core material and more particularly to a method of making microcapsules having an improved capsule core material retainability.

Microcapsules find their usefulness in various fields such as pressure-sensitive copying papers, heat-sensitive recording papers, adhesives, fertilizers, pharmaceuticals, foods, cosmetics, etc. There are known various method for making microcapsules useful for those purposes. Among them, there are included the "coacervation" method, the "interfacial polycondensation" method and the "in situ polymerization" method. It is also known that microcapsules each having a capsule wall of an aminoaldehyde resin are superior in the water resistance and the solvent resistance. For example, U.S. Pat. No. 3,016,308 discloses a method of making microcapsules in which urea-formaldehyde polycondensation resin capsule walls are formed in the presence of carboxymethyl cellulose. U.S. Pat. No. 3,516,941 discloses another method of making microcapsules in which urea-formaldehyde polycondensation resin capsule walls are formed in a suspension substantially containing no wetting agent. In these conventional methods of making microcapsules utilizing urea-formaldehyde resin, however, the system for making microcapsules must be carefully controlled as by stepwise and continual dilution since effective deposition of the polycondensation product on the capsule core material cannot be expected. In order to effectively carry out deposition of the polymerized resin on the capsule core material, some attempts have been made. For example, Japanese patent publication No. 12,380 of 1962 proposes to utilize as a dispersing agent a substance having an active radical which is capable of causing chemical or physiochemical bond and each of Japanese patent publication Nos. 12,518 of 1963, 4,717 of 1973 and 13,456 of 1974 discloses to utilize phase separation by an electrostatic interaction. In these improved methods, however, the steps for making microcapsules are complicated as well as in the so-called "complex coacervation" method. Those methods also involve a disadvantage that the capsule walls are often cracked in the step of drying. This may be considered due to the fact that the microcapsule walls contain water soluble components having opposite net electrical charges.

U.S. Pat. No. 4,001,140 discloses to make microcapsules having aminoaldehyde resin capsule walls by carrying out polycondensation of urea formaldehyde in the presence of ethylene-maleic anhydride copolymer, methyl vinyl ether-maleic anhydride copolymer or polyacrylic acid. However, microcapsule wall films produced utilizing these monomers do not have sufficient heat resistance. In addition this technique is disadvantageous in that when colorless chromogenic materials are used as the core material the colorless chromogenic materials have a color developed. UK patent application GB No. 2018711 A discloses a method of forming microcapsules in which urea and formaldehyde are polymerized around oily droplets in the presence of carboxylated polyvinyl alcohol to form urea-formaldehyde resin microcapsule walls. Although microcapsule wall films produced in this manner has a relatively good heat resistance, their moisture resistance is remarkably decreased. In addition this method is also disadvantageous in that the coloring by colorless chromogenic material used as capsule core material cannot be prevented.

The principal object of the invention is to provide a novel and improved method for making microcapsules each having a capsule wall of an aminoaldehyde resin in which deposition of an aminoaldehyde polycondensation resin on the surface of a capsule core material is effectively carried out.

Another object of the invention is to provide a novel and improved method for making microcapsules having sufficient moisture resistance and sufficient heat resistance.

A further object of the invention is to provide an improved method for making microcapsules which are especially useful for the production of pressure sensitive copying paper.

The other objects and advantages of the invention will become apparent from the following detailed description.

SUMMARY OF THE INVENTION

According to the invention the method of making microcapsules comprises performing polycondensation of an aminoaldehyde resin prepolymer in an aqueous dispersion including particles of hydrophobic core material in the presence of anion-modified polyvinyl alcohol to form aminoaldehyde resin microcapsule walls around said particles of hydrophobic core material.

DETAILED DESCRIPTION OF THE INVENTION

According to the invention, the microcapsules have a capsule wall of an aminoaldehyde resin obtained by polycondensation. Such the microcapsules can be produced by performing polycondensation of an aminoaldehyde resin prepolymer to form an aminoaldehyde resin in the presence of anion-modified polyvinyl alcohol in an aqueous dispersion including hydrophobic capsule core material particles dispersed therein. The hydrophobic capsule core material may be either of the liquid phase or of the solid phase. Among typically useful capsule core materials, there may be included: water-insoluble or substantially water-insoluble liquids such as animal oils, e.g. fish oil, and lard oil, vegetable oils, e.g. olive oil, peanut oil, linseed oil, soy-bean oil, and castor oil, mineral oils, e.g., petroleum, kerosene, xylene and toluene, and synthetic oils, e.g., alkylated diphenylalkane, alkylated naphthalene, diphenylethane, alkylated biphenyl, hydrogenated biphenyl, hydrogenated terphenyl, benzoic acid ester, salicylic acid ester and phthalic acid ester, water-insoluble metal oxides and salts; fibrous materials, e.g., cellulose and asbestos; water insoluble synthetic polymers; minerals; pigments; glasses; perfumes; flavourings; germicidal compositions; physiological compounds and fertilizers.

For pressure sensitive copying paper the above-mentioned oils as capsule core materials may include at least one colorless chromogenic material dissolved therein. Any of various known colorless chromogenic materials may be used for this purpose. Among them there are included, by way of examples, 3-3-bis(p-dimethylaminophenyl)-6-dimethylaminophthalide (CVL), 3,3-bis(p-dimethylaminophenyl)phthalide, 3-(p-dimethylaminophenyl)-3-(1,2-dimethylindole-3-yl)phthalide,
3-(p-dimethylaminophenyl)-3-(2-methylindole-3-yl)phthalide,
3,3-bis(1,2-dimethylindole-3-yl)-5-dimethylaminophthalide,
3,3-bis(1,2-dimethylindole-3-yl)-6-dimethylaminophthalide,
3,3-bis-(9-ethylcarbazole-3yl)-5-dimethylaminophthalide,
3,3-bis-(2-phenylindole-3-yl)-5-dimethylaminophthalide,
3-p-dimethylaminophenyl-3-(1-methylpyrrole-2-yl)-6-dimethylaminophthalide, 4,4'-bis-dimethylaminobenzhydrinebenzylether, N-halophenyl-leucoauramine, N-2,4,5-trichlorophenyl-leucoauramine, rhodamine-B-anilinolactam, rhodamine-(p-nitroanilino)lactam, rhodamine-(p-chloroanilino)lactam, 7-dimethylamino-2-methoxyfluoran, 7-diethylamino-2-methoxyfluoran, 7-diethylamino-3-methoxyfluoran, 7-diethylamino-3-chlorofluoran, 7-diethylamino-3-chloro-2-methylfluoran,
7-diethylamino-2,3-dimethylfluoran, 7-diethylamino-(3-acetylmethylamino)fluoran, 7-diethylamino-(3-methylamino) fluoran, 3,7-diethylaminofluoran, 7-diethylamino-3-(dibenzylamino)fluoran, 7-diethylamino-3-(methylbenzylamino)fluoran, 7-diethylamino-3-(chloroethylmethylamino)fluoran,
7-diethylamino-3-(diethylamino)fluoran, 2-phenylamino-3-methyl-6-(N-ethyl-N-p-toluyl-)amino-fluoran, benzoylleucomethyleneblue,
p-nitrobenzyl-leucomethylene blue, 3-methyl-spirodinaphtopyrane,
3-ethyl-spiro-dinaphthopyrane, 3,3'-dichloro-spirodinaphthopyrane,
3-benzylspiro-dinaphthopyrane, 3-methyl-naphtho-(3-methoxy-benzo)spiropyrane and 3-propyl-spirodibenzopyrane. The above colorless chromogenic materials may be used either solely or in combination.

According to the invention, an aminoaldehyde resin obtained by polycondensation of an aminoaldehyde resin prepolymer is used as capsule wall forming material. Accordingly an aminoaldehyde resin prepolymer is first prepared. The aminoaldehyde resin prepolymer used for the invention may be a water soluble prepolymer of at least one amine, such as urea, thiourea, alkyl urea, ethylene urea, acetoguanamine, benzoguanamine, melamine, guanidine, dicyandiamide, biuret and cyanamide and at least one aldehyde such as formaldehyde, acetaldehyde, paraformaldehyde, hexamethylenetetramine, butylaldehyde, crotonaldehyde, glyoxal, glutaraldehyde, benzaldehyde and furfural. The prepolymer formed has at least one functional group represented by

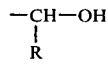

wherein R is a radical such that the aldehyde used may be represented by RCHO. Among the aminoaldehyde resin prepolymers those in which melamine and formaldehyde are used as main starting materials are preferred because the capsule wall obtained from that prepolymer has a uniform thickness, a sufficient strength and an improved core material retainability.

The preparation of the above mentioned aminoaldehyde prepolymer is preferably carried out at an alkaline state, namely at a pH of at least 7, preferably within the range of 7 to 12.

The aminoaldehyde resin obtained according to the invention may also include any of other polycondensation components such as phenol, m-methoxyphenol, resorcin, pyrogallol and the like for changing the other properties of the capsule wall as desired. As a matter of course, the amount of such other polycondensation components included should be within such a range that the desirable effects according to the invention can be achieved and maintained. These other polycondensation components may be added either during the preparation of the above mentioned prepolymer or to the system for performing polycondensation of said prepolymer. The latter would be preferred for obtaining capsule wall having a greatly improved core material retainability. The water soluble aminoaldehyde resin prepolymer is introduced to an aqueous dispersion including the before-mentioned hydrophobic capsule core material particles dispersed therein to established a system for making microcapsules. According to the invention polycondensation of an aminoaldehyde resin prepolymer to form aminoaldehyde resin microcapsule walls is performed in the presence of anion-modified polyvinyl alcohol. Accordingly, the system for making microcapsules also includes anion-modified polyvinyl alcohol.

The anion-modified polyvinyl alcohol is polyvinyl alcohol (hereinafter referred to merely as "PVA") having anionic radicals, such as carboxylic acid radicals, sulfonic acid radicals and phosphoric acid radicals, introduced at its main and/or side chains, carboxylated PVA is most preferred. Anion-modification of PVA may be carried out by copolymerization, graft polymerization or polymer reactions. Among the useful and preferred carboxylation techniques there are included:

(1) Saponification of copolymers of vinyl esters of organic acids such as vinyl formate, vinyl acetate and vinyl propionate with unsaturated monobasic acid, dibasic acid and anhydride or ester thereof such as acrylic acid, methacrylic acid, crotonic acid, maleic acid, fumaric acid, itaconic acid, maleic anhydride, itaconic anhydride, methyl acrylate, methyl methacrylate, ethyl methacrylate and the like;

(2) Saponification of copolymers of the above vinyl esters with acrylonitrile, methacrylonitrile, acrylamide, methacrylamide and the like;

(3) Saponification of polymers obtained by graft-polymerization of PVA or vinyl ester polymer with acrylonitrile, acrylamide, methyl acrylate, methyl methacrylate and the like;

(4) Polymer reactions of PVA, such as carboxymethylation of PVA, carboxyethylation of PVA or half esterification of reaction products of PVA with maleic acid, fumaric acid, phthalic acid, oxalic acid, malonic acid, succinic acid, adipic acid or anhydride thereof.

Introduction of sulfonic or phosphoric radicals to PVA when desired may be carried out by polymer reactions.

The amount of anionic radicals introduced in the PVA may be within the range of 0.5 to 50 mol %, preferably, 1 to 20 mol %, of the total monomer units of PVA.

In order to obtain capsule walls having a greatly improved core material retainability it is preferred that the anion-modified PVA used in the invention has hydrophobic radicals. Introduction of hydrophobic radicals to PVA may be performed by any of introduction of hydrophobic monomer units during the production of anion-modified PVA, alkylation, such as methylation and ethylation, of active hydrogen of anion-modified PVA, and acetalization of PVA. One of the most economically advantageous step for this purpose is to control saponification of polymers of vinyl esters of organic acids, said polymers having anionic radicals.

The amount of hydrophobic radicals to be introduced to PVA may vary at will within the range capable of keeping PVA water soluble according to the kind of the core material used. Preferably, however, the anion-modified PVA may have hydrophobic radicals at 1 to 30 mol %, most preferably, 2 to 20 mol % of the total monomer units. The hydrophobic radicals may be included in PVA either in the form of hydrophobic monomer units remained such as ethylene monomer units and propylene monomer units or in the form of hydrophobic radicals added, such as methyl, ethyl, formal, acetoacetal, butylal and acetyl.

The anion-modified PVA may be used in an amount of at least 0.1% by weight of the amount of the aqueous dispersion. The preferred amount of the anion-modified PVA for obtaining improved microcapsules in a simpler manner would be at least 0.5% by weight, most preferably, at least 2% by weight of the amount of the aqueous dispersion. The upper limit of the amount of the anion-modified PVA depends on the viscosity of the system and the device used for making microcapsules but generally may be at largest 20% by weight of the aqueous dispersion.

The polycondensation of the prepolymer described for forming an aminoaldehyde resin may preferably be performed in the above mentioned aqueous dispersion in an acidic state, preferably, at pH of 2 to 6. In order to adjust the system for the production of microcapsules in such an acidic state like this any of known acid catalysts such as formic acid, acetic acid, citric acid, oxalic acid, paratoluenesulphonic acid, hydrochloric acid, sulfuric acid, nitric acid, phosphoric acid, ammonium chloride and ammonium sulfate may be used. For this purpose it is also possible to utilize the acidic radicals included in the anion-modified PVA.

In order to accelerate the polycondensation the system for the production of microcapsules may be heated at a temperature between the range of 20° to 100° C., most preferably, within the range of 35° to 70° C. In this manner microcapsules having stable properties can be produced for relatively short time.

The system for the production of microcapsules may also include any conventional protective colloidal materials and surfactants. It is a matter of course that the amount of such protective colloidal materials and/or surfactants should be within such a range that the effects which the invention aims may not be prevented.

According to the invention the polymerized resin is effectively deposited on each of the capsule core material particles. This can be achieved by merely admixing various materials for forming microcapsules and providing proper conditions for polycondensation. Careful control of the system as required in the conventional method, for example, as stepwise and continuous dilution, is not needed. The obtained microcapsule walls has a good moisture resistance and a good heat resistance. In addition, when colorless chromogenic material is used as the capsule core material, the coloring of the capsule dispersion which has been inevitable in the conventional technique can be unexpectedly effectively prevented. Thus the microcapsules made by according to the invention especially finds its usefulness in the production of pressure sensitive copying paper.

The theory and mechanism why the good result is obtained according to the invention are not clear. However, it may be assumed that the presence of anion-modified PVA would provide the microcapsule making system with a certain desirable condition especially in combination of the utilization of an aminoaldehyde resin prepolymer to effectively deposit the polycondensation product on the surface of capsule core material.

DETAILED DESCRIPTION OF THE PREFERRED EMBODIMENT

The following examples serve to illustrate the invention in more detail especially in connection with production of pressure sensitive copying paper, although the invention is not limited to the examples. Unless otherwise indicated, parts and % signify parts by weight and % by weight, respectively.

EXAMPLE 1

23.6 parts of monochloroacetic acid was added to a solution prepared by dissolving 2.15 parts of vinyl acetate in 22.9 parts of acetone. Then 40 parts of 50% aqueous solution of sodium hydroxide in the resultant solution was added dropwise. While the mixture boiled with the exothermic reaction, it was further maintained at 54° C. for 3 hours to accelerate the reaction. The product was separated from acetone and purified by a dialysis. Thus obtained anion-modified PVA has 12 mol % of carboxymethyl group and 8 mol % of acetyl group with respect to the total monomer unit. 100 parts of 3.5% aqueous solution of the anion-modified PVA, the pH of which was adjusted to 3.2, was used as a medium for preparing microcapsules.

2.8 Parts of crystal violet lactone and 0.7 parts of benzoyl leucomethylene blue were dissolved in 100 parts of alkyl naphthalene (KMC oil manufactured by Kureha Kagaku Kogyo Kabushiki Kaisha, Japan) to prepare an oily solution. 35 parts of the oily solution was dispersed in the above medium for preparing microcapsules to obtain an emulsion containing oily capsule core material particles which have an average particle size of 3.8 microns. On the other hand, 3 parts of urea was added to 7.5 parts of 37% aqueous solution of formaldehyde, the pH of which was adjusted to 8.0 with sodium hydroxide, and the mixture was heated at 70° C. for one hour to prepare an aqueous solution of urea-formaldehyde resin prepolymer. The prepolymer had 148 mol % of hydroxymethyl group per urea unit. The prepolymer was added to the above emulsion. Further, 3 parts of 10% aqueous solution of resorcin was added to the emulsion and the mixture was heated at 55° C. for 3 hours with gently stirring and cooled on standing to obtain a milky white microcapsule dispersion.

30 Parts of cellulose powder and 150 parts of 20% aqueous solution of oxidized starch were added to thus obtained microcapsule dispersion with respect to 100 parts of the capsule core material in it to prepare a capsule coating composition. The coating composition was coated on one surface of a paper sheet of 40 g/m² in an amount of 4 g/m² on dry basis and dried to obtain a capsule coated paper sheet. The appearance of the capsule coated surface was superior white without any coloration.

Control 1

Example 1 was repeated except that a commercial non-modified PVA (Kuraray PVA 117 manufactured by Kuraray Co., Ltd., Japan) was used instead of the anion-modified PVA. The resultant capsule did not have a sufficient wall strength. When the coating composition was applied on a base sheet and dried, the capsule core material flew out so that any useful capsule coated paper sheet for pressure-sensitive copying system was not prepared.

Control 2

Example 1 was repeated except that 3 parts of urea and 7.5 parts of 37% aqueous solution of formaldehyde were directly added to the emulsion containing oily capsule core material particles instead of the urea-formaldehyde resin prepolymer to obtain a microcapsule dispersion.

The resultant microcapsule dispersion took a blue color. The capsule coated paper sheet prepared with the microcapsule dispersion in the same manner as in Example 1 had a light blue capsule coated surface.

EXAMPLE 2

Example 1 was repeated except that the urea-formaldehyde resin prepolymer was added to the medium for preparing capsules before emulsifying the capsule core material to obtain a milky white microcapsule dispersion.

The resultant microcapsule dispersion was used to prepare a capsule coated paper sheet in the same manner as in Example 1. The appearance of the capsule coated surface was superior white without any coloration.

EXAMPLE 3

10 Parts of melamine was added to 30 parts of 37% aqueous solution of formaldehyde, the pH of which was adjusted to 7.0 with sodium hydroxide, and the mixture was heated at 60° C. for 30 minutes to prepare an aqueous solution of melamine-formaldehyde resin prepolymer. The prepolymer had 295 mol % of hydroxymethyl group per melamine unit. On the other hand maleic anhydride-vinyl acetate copolymer in which the maleic anhydride content was 8 mol % was saponified with sodium hydroxide to obtain a PVA having carboxyl group with a saponification degree of 87%. To 350 parts of 1.5% aqueous solution (pH 4.0) of the above PVA, 100 parts of the same capsule core material as used in Example 1 was added to prepare an emulsion containing oily capsule core material particles which have an average particle size of 5.6 microns.

The above prepolymer was slowly added to the obtained emulsion with gently stirring. The formation of capsule wall began immediately after the addition. The mixture was heated at 60° C. for 2 hours and cooled on standing to obtain a milky white microcapsule dispersion. The capsule coated paper sheet prepared with thus obtained microcapsule dispersion in the same manner as in Example 1 had a superior white appearance without any coloration.

EXAMPLE 4

10 parts of 10% aqueous solution of glycine was added to the aqueous solution of melamine-formaldehyde resin prepolymer obtained in Example 3 and the mixture was heated at 60° C. for 2 minutes to obtain an aqueous solution of anion modified melamine-formaldehyde resin prepolymer. Thus obtained prepolymer was used to prepare a microcapsule dispersion and a capsule coated paper sheet in the same manner as in Example 3. The resultant capsule coated surface had a superior white appearance without any coloration.

EXAMPLE 5

10 Parts of melamine was added to 30 parts of 37% aqueous solution of formaldehyde, the pH of which was adjusted to 7.0 with sodium hydroxide, and the mixture was heated at 70° C. for 30 minutes to prepare a melamine-formaldehyde prepolymer which had 310 mol % of hydroxymethyl group per melamine unit. To the prepolymer system were added 10 parts of water and 1 part of sulfamic acid and the resultant system was maintained at 60° C. for 2 minutes to prepare an aqueous solution of anion-modified melamine-formaldehyde prepolymer. On the other hand, maleic anhydride-vinyl acetate copolymer in which maleic anhydride content was 3 mol % was saponified with sodium hydroxide to obtain a PVA containing carboxyl group, the saponification degree of which was 92%. 100 Parts of the same capsule core material as used in Example 1 was added to 150 parts of 5% aqueous solution (pH 4.0) of the PVA to prepare an emulsion in which the oily droplet had an average particle size of 5.6 microns.

The above aqueous solution of prepolymer was slowly added to the emulsion maintained at 55° C. with gently stirring. The capsule wall was formed as soon as the addition and the aqueous system was maintained at the same temperature for 3 hours to obtain a milky white microcapsule dispersion the pH of which was 5.3 and the microcapsule in which had a sufficient harden wall. The microcapsule dispersion was used to prepare a capsule coated paper sheet in the same manner as in Example 1.

Control 3

Example 5 was repeated except that a commercial non-modified PVA (Kuraray PVA 205 manufactured by Kuraray Co., Ltd., Japan) was used instead of the anion-modified PVA. When the prepolymer was added to the obtained emulsion, the aqueous system was wholly coagulated and a desired capsule could not be obtained.

Control 4

Example 5 was repeated except that 30 parts of 37% aqueous solution of formaldehyde, 10 parts of melamine and 10 parts of 10% aqueous solution of sulfamic acid were directly added to the emulsion containing oily capsule core material particles instead of the melamine formaldehyde prepolymer to obtain a mirocapsule dispersion. The microcapsule dispersion was indigo blue and contained a large number of resinous lumps. The microcapsule dispersion was used in the same manner as in Example 1 to prepare a capsule coated paper sheet. The capsule coated surface was blue.

EXAMPLE 6

There was dissolved in 300 parts of dimethyl sulfoxide 30 parts of ethylene-polyvinylalcohol copolymer (ethylene content: 2 mol %) prepared by saponifying ethylene-vinyl acetate copolymer with sodium hydroxide. 10 parts of maleic anhydride and 100 parts of pyridine were added to the resultant solution and the mixture was reacted at 45° C. for 24 hours. Then the product was purified by a dialysis to obtain an anion modified PVA in which the maleic acid substitution degree was 7 mol %. Example 3 was repeated except that the above anion modified PVA was used to obtain a milky white microcapsule dispersion and a capsule coated paper sheet.

EXAMPLES 7 TO 13

Vinyl acetate and crotonic acid were copolymerized with the use of α,α'-azobisisobutyronitrile as a catalyst. The resulant polymer was dissolved in methanol and saponified with sodium hydroxide to obtain seven anion-modified PVAs as indicated in Table 1. Example 3 was repeated except that each thus obtained anion modified PVA was used to prepare capsule coated paper sheets for pressure sensitive copying system. They had superior white appearance without any coloration.

TABLE 1

| | Composition of anion modified PVA (mol %) | | |
|---|---|---|---|
| | crotonic acid | vinyl acetate | vinyl-alcohol |
| Example 7 | 0.8 | 20.5 | 78.7 |
| Example 8 | 1.5 | 2.1 | 96.4 |
| Example 9 | 3.2 | 14.5 | 82.3 |
| Example 10 | 3.7 | 5.4 | 90.9 |
| Example 11 | 6.1 | 2.3 | 91.6 |
| Example 12 | 10.1 | 8.9 | 81.0 |
| Example 13 | 21.3 | — | 78.7 |

The properties of the thus obtained capsule coated paper sheets were examined with the following manners.

At first, an acceptor coated sheet was prepared by the steps of adding 65 parts of aluminum hydroxide, 20 parts of zinc oxide, 15 parts of a co-melt of zinc-3,5-di(α-methylbenzyl) salicylate and αmethylstyrene-styrene copolymer in which the co-melting ratio was 80/20 and an aqueous solution containing 5 parts of polyvinyl alcohol to 300 parts of water, finely dividing the mixture for 24 hours in a ball-mill to obtain a dispersion, adding to the dispersion a latex of carboxylated styrene-butadiene copolymer in which the solid amount was 20 parts to prepare a coating composition, applying the coating composition on one surface of a base paper sheet of 40 g/m$^2$ in an amount of 5 g/m$^2$ on dry basis and drying the coated paper sheet.

1. Color formability

Each capsule coated paper sheet obtained in Examples and Controls was put on the above acceptor coated sheet so that the coated layers were close to each other to provide samples. The samples were pressed with 100 Kg/cm$^2$ for 1 minute to form a color image. The color density of the image on the acceptor coated surface was measured by a spectrophotometer at 600 nm with the use of magnesium oxide as a standard. The measured reflection ratios are shown in Table 3.

2. Stability of color forming

Each capsule coated sheet obtained in Examples and Controls was treated by standing under the following conditions:

(a) heat resistance—at 120° C. for 5 hours.
(b) humidity resistance—at 50° C., 90% RH for 1 day.

The color densities of the samples after color images were formed were measured and the results are shown in Table 2 in terms of the color density decreasing ratios with the following ranks:
A—from 0% to less than 5%
B—from 5% to less than 10%
C—from 10% to less than 20%
D—from 20% to less than 50%
E—above 50%

3. Physical Strength (Smudging resistance)

Capsule coated paper sheets were pressed with 10 Kg/cm$^2$ for one minute and then each of the capsule coated paper sheet put on the acceptor coated sheet so that the coated layers were close to each other to provide samples. A pressure of 5 Kg/cm$^2$ was applied on the samples and they were allowed to stand in an oven at 118° C. for 3 hours under the pressure. Then the smudging degree of capsule coated paper sheets was examined. The results were valued with the following equation. They are shown in Table 2.

$$\frac{X \times 100}{Y} \ (\%)$$

X: Reflection ratio on the acceptor coated layer after the above treatment.
Y: Reflection ratio on the acceptor coated layer before the above treatment.

The reflection ratio was measured in the same manner as in the above color formability test.

TABLE 2

| | Color formability | Heat resistance | Humidity resistance | Smudging (%) |
|---|---|---|---|---|
| Example 1 | 8 | B | A | 78 |
| Control 2 | 13 | C | D | 65 |
| Example 2 | 8 | B | A | 77 |
| Example 3 | 7 | B | A | 98 |
| Example 4 | 7 | A | A | 100 |
| Example 5 | 6 | A | A | 100 |
| Control 4 | 32 | E | D | 49 |
| Example 6 | 7 | B | A | 97 |
| Example 7 | 8 | B | B | 91 |
| Example 8 | 7 | B | A | 95 |
| Example 9 | 7 | A | A | 100 |
| Example 10 | 6 | A | A | 100 |
| Example 11 | 8 | B | A | 96 |
| Example 12 | 6 | A | A | 100 |
| Example 13 | 9 | B | B | 89 |

As shown in Table 2, every pressure sensitive copying systems prepared with the use of microcapsules obtained by the process of the invention were superior in color formability, heat resistance, humidity resistance and smudging resistance.

What we claim is:

1. A method of making microcapsules comprising the steps of preparing an aminoaldehyde resin prepolymer of at least one amine and at least one aldehyde, and performing polycondensation of said aminoaldehyde resin prepolymer in an aqueous dispersion including particles of hydrophobic core material in the presence of anion-modified polyvinyl alcohol to form aminoaldehyde resin microcapsule walls around said particles of hydrophobic core material, said anion-modified polyvinyl alcohol being used in an amount between about 0.1 and about 20% by weight of the amount of said aqueous dispersion.

2. A method of making microcapsules according to claim 1 in which said aminoaldehyde resin prepolymer is a melamine-formaldehyde resin prepolymer.

3. A method of making microcapsules according to claim 1 in which said anion-modified polyvinyl alcohol has anionic radicals at 0.5 to 50 mol. % of its total monomer units.

4. A method of making microcapsules according to claim 3 in which said anion-modified polyvinyl alcohol has anionic radicals at 1 to 20 mol. % of its total monomer units.

5. A method of making microcapsules according to claim 1 in which said anion-modified polyvinyl alcohol has hydrophobic radicals at 1 to 30 mol. % of its total monomer units.

6. A method of making microcapsules according to claim 5 in which said anion-modified polyvinyl alcohol has hydrophobic radicals at 2 to 20 mol. % of its total monomer units.

7. Microcapsules which are prepared by a method as claimed in claim 1.

8. Pressure sensitive copying sheet comprising a support having coated thereon a layer of microcapsules as claimed in claim 7.

* * * * *